United States Patent [19]
Liang et al.

[11] Patent Number: 5,978,062
[45] Date of Patent: Nov. 2, 1999

[54] METHOD OF FABRICATING CLOSED CAVITY LIQUID CRYSTAL DISPLAY HAVING A PLURALITY OF CAVITIES EXTENDING COMPLETELY THROUGH INSULATING LAYER

[75] Inventors: Bau-Jy Liang; Shu-Hsia Chen, both of Hsinchu; Chung-Kuang Wei, Taipei Hsien; Chen-Lung Kuo, Hsinchu, all of Taiwan

[73] Assignee: National Science Council, Taipei, Taiwan

[21] Appl. No.: 08/823,389

[22] Filed: Mar. 24, 1997

[51] Int. Cl.[6] .................. G02F 1/1339; G02F 1/1333; G02F 1/1337; G02F 1/13
[52] U.S. Cl. .................. 349/155; 349/138; 349/187; 349/89; 349/132
[58] Field of Search .................. 349/155, 138, 349/156, 157, 88, 89, 187

[56] References Cited

U.S. PATENT DOCUMENTS

| | | | |
|---|---|---|---|
| 5,015,074 | 5/1991 | Clerc et al. | 349/79 |
| 5,061,047 | 10/1991 | Bradshaw et al. | 359/63 |
| 5,418,633 | 5/1995 | Kim et al. | 349/157 |
| 5,469,280 | 11/1995 | Jang | 349/157 |
| 5,668,617 | 9/1997 | Na | 349/156 |
| 5,673,092 | 9/1997 | Horie et al. | 349/86 |
| 5,784,137 | 7/1998 | Shiomi et al. | 349/88 |
| 5,831,710 | 11/1998 | Colgan et al. | 349/156 |
| 5,880,803 | 3/1999 | Tamai et al. | 349/156 |

FOREIGN PATENT DOCUMENTS

| | | | |
|---|---|---|---|
| 0 136 696 | 4/1985 | European Pat. Off. | G02F 1/137 |
| 1-079723A | 3/1989 | Japan | 349/124 |
| 1-284829A | 11/1989 | Japan | 349/127 |
| 5-072515A | 3/1993 | Japan | 349/124 |

*Primary Examiner*—William L. Sikes
*Assistant Examiner*—Kari M. Horney
*Attorney, Agent, or Firm*—Sughrue, Mion, Zinn, Macpeak & Seas, PLLC

[57] ABSTRACT

A closed-cavity liquid-crystal display is provided, which is a liquid-crystal display having a wide angle of view. The liquid-crystal display comprises: an insulator layer formed with a plurality of cavities extending completely through the insulating layer, in which liquid-crystal material is filled into the plurality of cavities; a first substrate, placed on one side of the insulator layer, in which a first electrode is formed on one side of the first substrate near the insulator layer; and a second substrate, placed on the other side of the insulator layer, in which a second electrode is formed on one side of the second substrate near the insulator layer, so that the first electrode and the second electrode are used to drive and vary the alignment of liquid-crystal molecules in the plurality of cavities. The inner circumference of the closed cavity is coated with a homeotropic alignment agent, so that the alignment of the liquid-crystal molecules is circularly symmetric, and the optical performance of the liquid-crystal display is independent of the azimuthal angle.

12 Claims, 16 Drawing Sheets

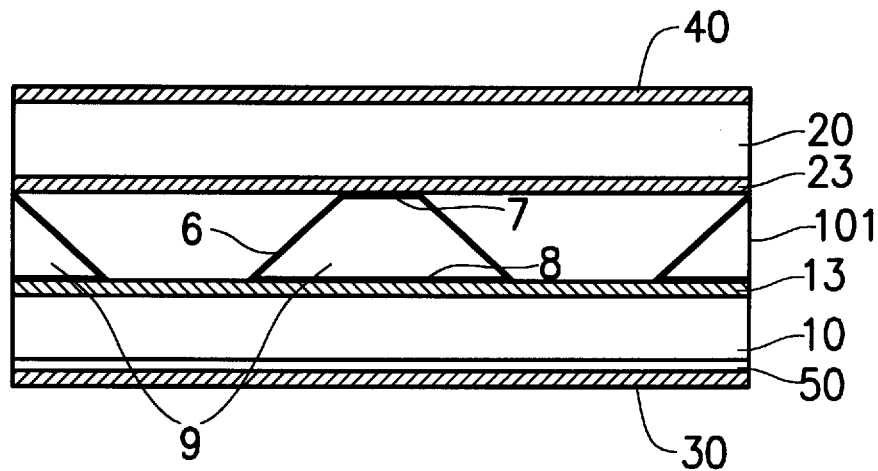
FIG. 4a
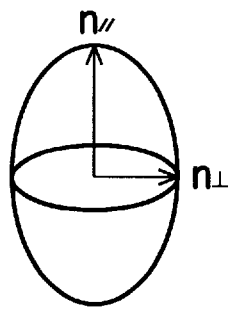 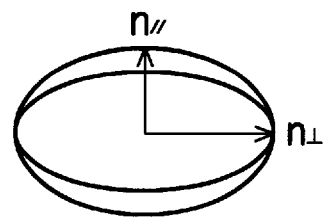
FIG. 4b    FIG. 4c
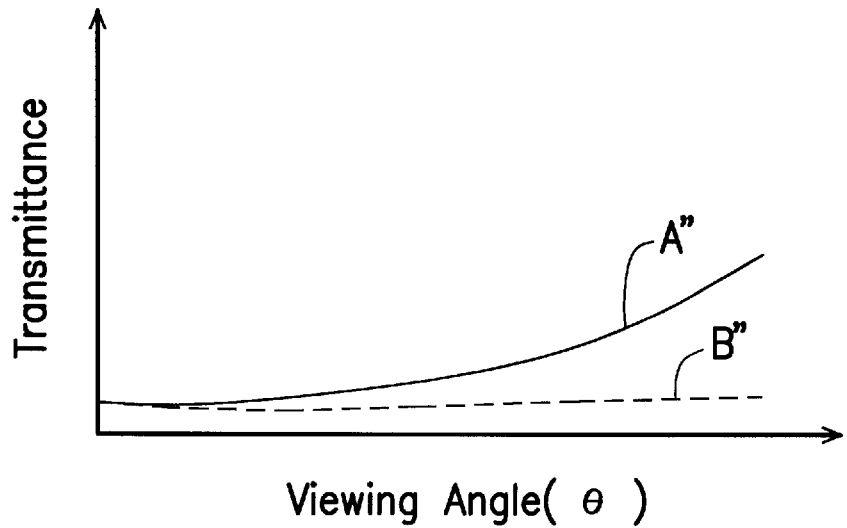
FIG. 4d

METHOD OF FABRICATING CLOSED CAVITY LIQUID CRYSTAL DISPLAY HAVING A PLURALITY OF CAVITIES EXTENDING COMPLETELY THROUGH INSULATING LAYER

BACKGROUND OF THE INVENTION

1. Field of the Invention

The present invention relates generally to a liquid-crystal display. In particular, the invention relates to a liquid-crystal display with a wide viewing angle, and more particularly relates to a closed-cavity liquid-crystal display.

2. Description of Prior Art

Liquid-crystal displays (LCD) are widely used as the displays for portable computers and televisions since such displays are light, thin and energy-saving. At present, the most popular commercial LCDs are twist-nematic (hereinafter briefly referred to as TN) mode LCDs and super twist-nematic (STN) mode LCDs. The total twist angle of the molecules is normally 90 degrees for TN LCDs, and equal to or more than 180 degrees for STN LCDs. These types of LCDs are suitable for use as black/white gray scale displays. However, utilizing such LCDs as multiple gray-scale or full-color displays causes a severe problem of viewing angle dependency. That is because the optical paths for the incident light are different for different entrance angles, i.e., the reflective index of the liquid-crystal varies with the variation of entrance angle. Referring to FIG. 1a, which illustrates a cross section of a TN LCD, while a bias voltage is applied, the liquid-crystal molecules 5 incline at a tilt angle $\phi$. The corresponding reflective index is $n_{//}$ or $n_{\perp}$ while the entrance angle is $\theta$ or $-\theta$. The different reflective indices cause different optical paths; as a result, the optical transmittances are different. The contrast ratio is different for the same tilt angles ($\pm\theta$). Furthermore, while watching the display panel along a tilt direction, the place that should be dark leaks light and hence the contrast ratio is degraded. Furthermore, the black and white of the intermediate gray scales are reversed. Thus, the picture can not be really reproduced. This problem becomes more severe while watching the display along its vertical direction. The total viewing angle of this case without gray scale reverse is merely about 40 degrees.

To solve the above problems, a display mode of divided domain or multi-domain of liquid-crystal molecules in one pixel is provided, which has been proven to have a viewing angle more than twice that of TN-LCD's. Referring to FIG. 1b, which illustrates the cross section of a multi-domain LCD which has two domains in one pixel, while a bias voltage exists, the tilt angles of the liquid-crystal molecules in the two domains are $\phi$ and $-\phi$, respectively. When the light is incident at a with a tilt angle $\theta$, the effective refractive index of the liquid-crystal is $n_{//}$. When the light is incident at b with the tilt angle $\theta$, the effective refractive index of the liquid-crystal is $n_{\perp}$. When the light is incident at a' with a tilt angle $-\theta$, the effective refractive index of the liquid-crystal is $n_{\perp}$. When the light is incident at b' with the tilt angle $-\theta$, the effective refractive index of the liquid-crystal is $n_{//}$. Therefore, the averaged intensity of the light incident with the angle $\theta$ is the same as that of the light incident with the angle $-\theta$. That is, the contrast ratios are the same at both the tilt angle $\theta$ and the tilt angle $-\theta$. Thus, the viewing angle is broadened. However, while fabricating such multi-domain liquid-crystal displays, a photolithography process has to be used to divide the multiple domains. Each domain needs to be treated by rubbing along a different direction. However, this rubbing process introduces impurities in the LCD cells and deteriorates the property of the LCD. The static electricity produced by rubbing the substrate tends to damage such devices as thin-film transistors, and thereby lower the yield.

Another known prior art is the axially symmetric aligned microcell (hereinafter referred to as ASM), which is disclosed in "Axially Symmetric Aligned Microcell (ASM) Mode: Electro-Optical Characteristics of New Display Mode with Excellent Wide Viewing Angle" by N. Yamada, Sokohzaki, F. Funada, K. Awane, in *SID 95' Digest*, p.575. The viewing angle without gray scale reverse is about ±60° for an ASM liquid-crystal display. Refer to FIG. 1c, which illustrates the structure of an ASM liquid-crystal display. The fabrication of the ASM liquid-crystal display is accomplished by making the polymer 4 separate the liquid-crystal 3 into each pixel according to the phase separation of the polymer and the liquid-crystal. As shown in FIG. 1d, a set of polarizers whose transmitting axes are the X-axis and the Y-axis, respectively, are used to measure the contrast ratio at each viewing angle. As a result, the viewing angle $\theta$ is only 40° when the azimuthal angle $\phi$ is 45°, 135°, 225° or 315°. Furthermore, it is difficult to fabricate an ASM liquid-crystal display since the upper electrode and the lower electrode thereof must be precisely aligned to make the liquid-crystal able to separate to each pixel.

SUMMARY OF THE INVENTION

Accordingly, an object of the present invention is to provide a closed-cavity type of liquid-crystal display device, which is a liquid-crystal display that has high contrast, high image quality, wide viewing angle and gray scale capability (or full color image).

To accomplish the object, a closed cavity of liquid-crystal (CCLC) cell of this invention is made by filling liquid-crystal in a cavity formed in an insulator layer, in which the cavity has an alignment layer on its inner circumference, and positioning two transparent substrates on the top and bottom of the cavity. The inner circumference of the cavity is treated to make liquid-crystal molecules be aligned therein. The fabrication of a CCLC can be made by a known photolithography process and an etching process, and then liquid-crystal material is filled in the CCLC. The CCLC can be combined with other optical devices such as a polarizer, compensator, and reflector, or the like, to display images.

One feature of the CCLC according to the present invention is that the alignment of liquid-crystal molecules is closely affected by the shape of the cavity and the material coated on the inner circumference of the cavity. Take a cylindrical cavity having homeotropic alignment layer formed on its inner circumference, for example. The liquid-crystal directors are aligned radially in such a cylindrical cavity. Therefore, the viewing angle of a display made of such CCLCs is wide and is independent of the azimuthal angle.

BRIEF DESCRIPTION OF THE DRAWINGS

The following detailed description, given by way of example and not intended to limit the invention solely to the embodiments described herein, will best be understood in conjunction with the accompanying drawings in which:

FIG. 2b is a diagram illustrating the structure of the preferred embodiment of FIG. 2a;

FIG. 2c is a cross-sectional diagram illustrating the geometric structure of a CCLC of FIG. 2a;

FIG. 3b is a cross-sectional diagram illustrating the geometric structure of a CCLC of FIG. 3a;

FIG. 4a is a cross-sectional diagram illustrating a preferred embodiment using the CCLC according to the present invention;

FIG. 4b is a diagram illustrating the index ellipsoid for the liquid-crystal;

FIG. 4c is a diagram illustrating the index ellipsoid for the compensator;

FIG. 4d is a diagram illustrating the relation between the viewing angle and transmission of CCLC with and without a compensator;

The same reference number is used to indicate the same component or device.

DETAILED DESCRIPTION OF THE PREFERRED EMBODIMENTS

Many different variations for the closed-cavity liquid-crystal display of the present invention can be made depending on the shape of the cavity, the polarizer and reflector positions, the number of phase compensators, the alignment of liquid-crystal molecules and the dielectric constant of anisotropic liquid-crystal. Some examples are given below.

Preferred Embodiment 1

Figure 1A:
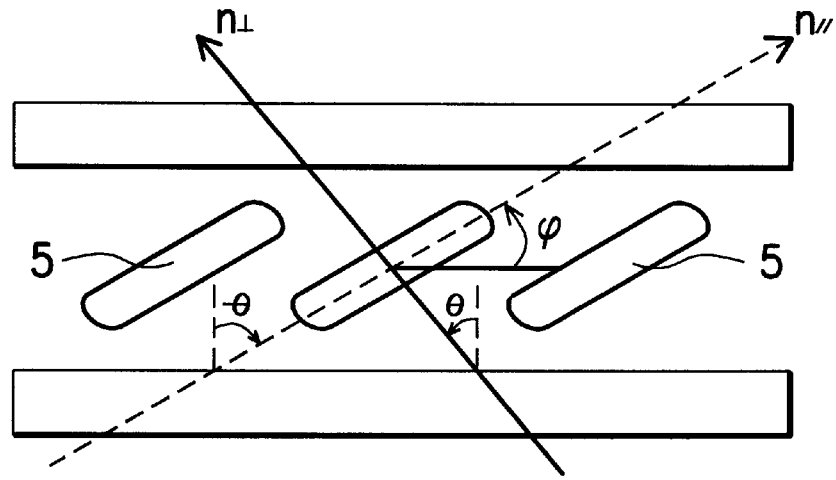
FIG. 1a is a cross-sectional diagram illustrating the distribution of molecules of twisted nematic liquid-crystal with an applied electric field.
Figure 1B:
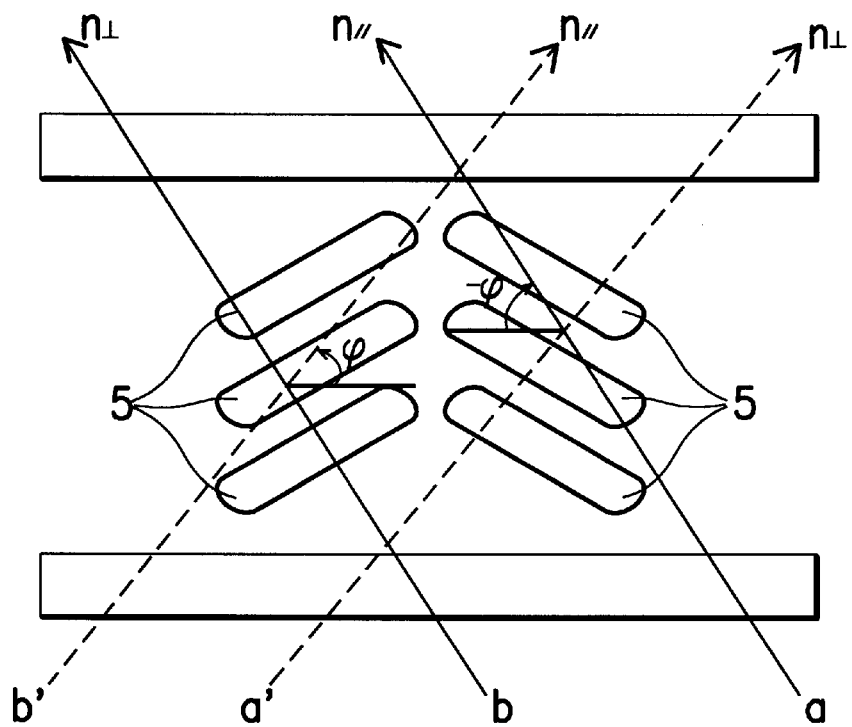
FIG. 1b is a cross-sectional diagram illustrating the distribution of molecules of two-domain liquid-crystal with an applied electric field.
Figure 1C:
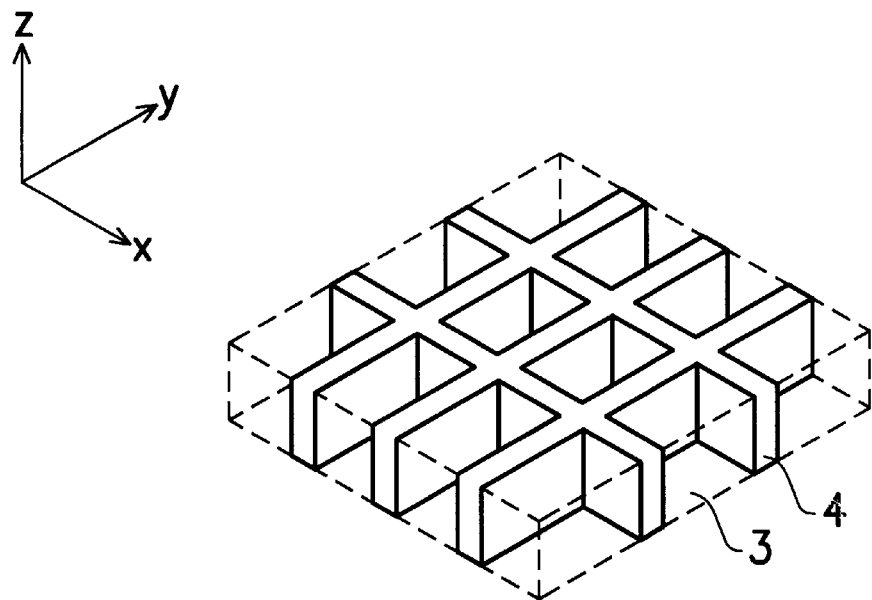
FIG. 1c is a diagram illustrating the structure of an ASM liquid-crystal display.
Figure 1D:
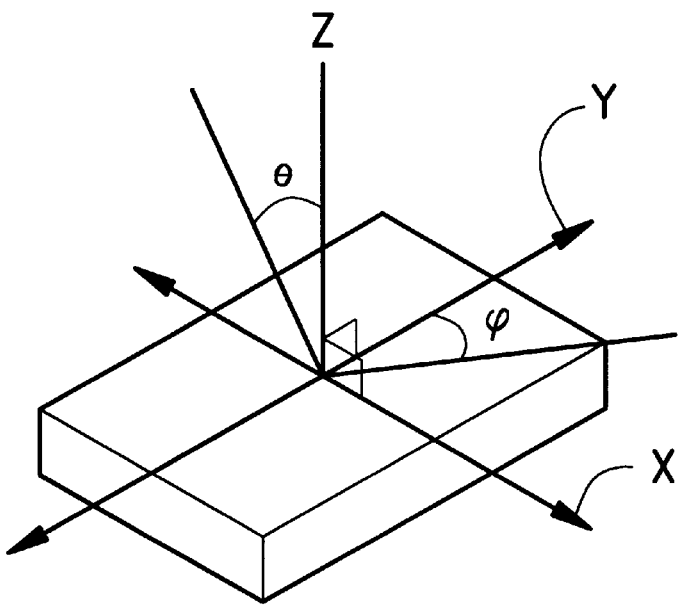
FIG. 1d is a diagram illustrating the coordinate to define the viewing angle.
Figure 2A:
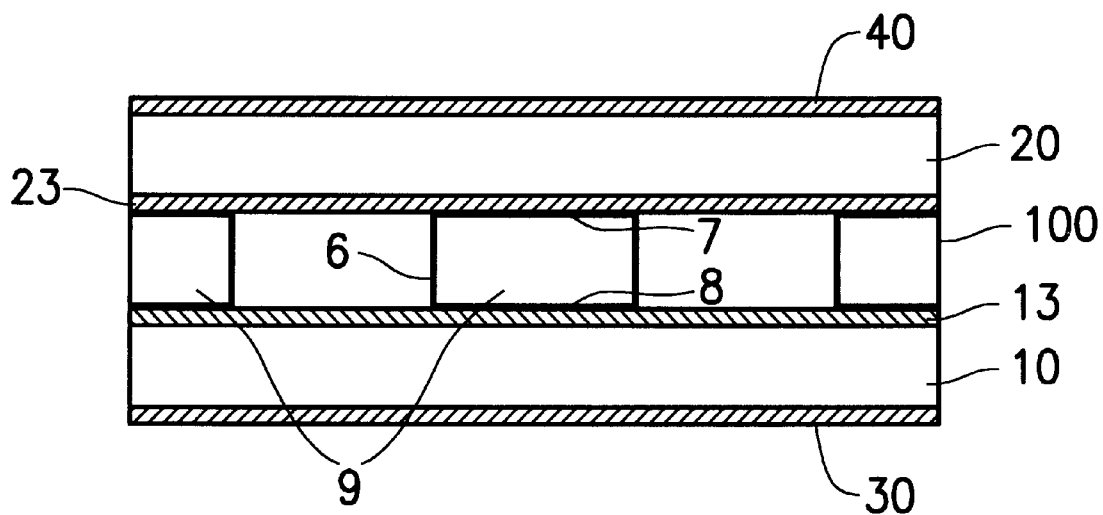
FIG. 2a is a cross-sectional diagram illustrating a preferred embodiment of CCLC according to the present invention.

Referring to FIG. 2a, the CCLC display device of the present invention comprises: an insulator layer 100, on which a plurality of cylindrical cavities 9 filled with liquid-crystal are formed; a first substrate 10, positioned on one side of the insulator layer 100, and provided with a transparent electrode 13 on one side thereof near the insulator layer 100; and a second substrate 20, positioned on another side of the insulator layer 100, and provided with a transparent electrode 23 on one side thereof near the insulator layer 100, so that the transparent electrodes 13 and 23 can drive and vary the alignment of the liquid-crystal molecules in the cavities 9. Such a CCLC display device can further comprises: a first linear polarizer 30 placed on another side of the first substrate 10; and a second linear polarizer 40 placed on another side of the second substrate 20, in which the absorption axis of the second linear polarizer 40 is perpendicular to that of the first linear polarizer 30.

Figure 2B:
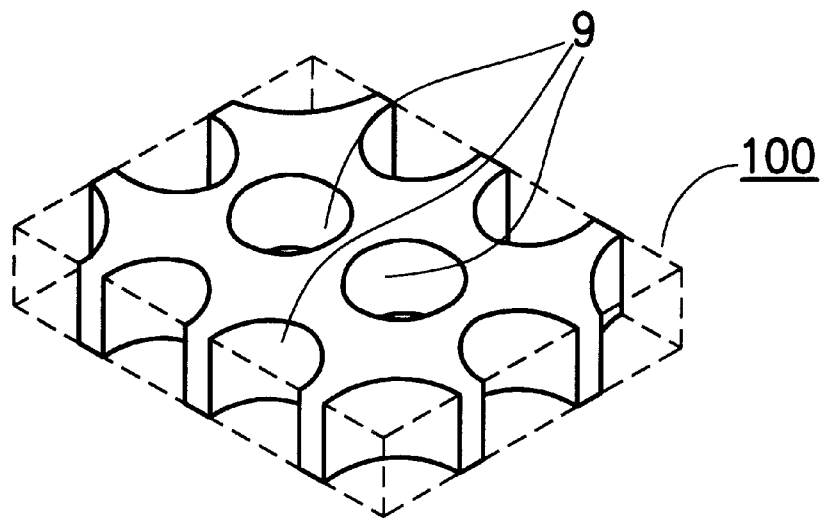

Refer to FIG. 2b, the insulator layer 100 is a solid film and can be made of oxide, nitride, oxide and nitride, or polymer. A plurality of cylindrical cavities 9 are formed in the solid film, and are sandwiched by the first substrate 10 and the second substrate 20 to form a plurality of closed cavities. As shown in FIG. 2a, alignment layers 6, 7, and 8 are coated on the inner sides of the top, the bottom and the circumference of the closed cavities to control the alignment of liquid-crystal molecules being filled in the closed cavities. Each pixel on the display may correspond to one or several closed cavities.

Regarding to the fabrication method of the CCLC display device of the present invention, a variety of implementations can be provided, for example, the fabrication method may include the steps of: (1) coating transparent conductive layers on the first substrate 10 and the second substrate 20, respectively, and patterning the transparent conductive layers to form driving electrodes 13 and 23 by etching; (2) depositing an insulator layer 100 having a thickness of about 0.2 to 10 μm on the first substrate 10 by plasma-enhanced chemical-vapor deposition (PECVD); (3) forming a plurality of cavities 9 in the insulator layer 100 by a photolithography process and an etching process; (4) dipping the second substrate 20 and the first substrate 10 having the insulator layer 100 to form an alignment layer thereon; (5) filling liquid-crystal in the plurality of cavities, and covering the insulator layer 100 by the second substrate 20 to confine the liquid-crystal in the cavities.

Many other processes can be used in the above fabrication method, for example, in step (2), instead of the use of PECVD to form the insulator layer 100, atmospheric-pressure chemical-vapor deposition (APCVD), low-pressure chemical-vapor deposition (LPCVD), or metal-organic chemical-vapor deposition (MOCVD) can also be used to form an insulator layer. The etching process can be dry etching or wet etching in step (3). The shape of the cavity can be circular, elliptical, rectangular, hexagonal or multilateral, and the cavity can be a pillared cavity or a conical cavity. Moreover, the alignment layer coated on the first substrate, the second substrate and the inner circumference of the cavities can be the same alignment agent or different alignment agent. In the preferred embodiment above, the homeotropic alignment agent DMOAP is used, and negative ($\Delta\epsilon<0$) nematic liquid-crystal material is filled in the cavities in step (5). Therefore, the alignment of the liquid-crystal molecules is consecutively vertical to the boundary except for the singular ring.

Figure 2C:
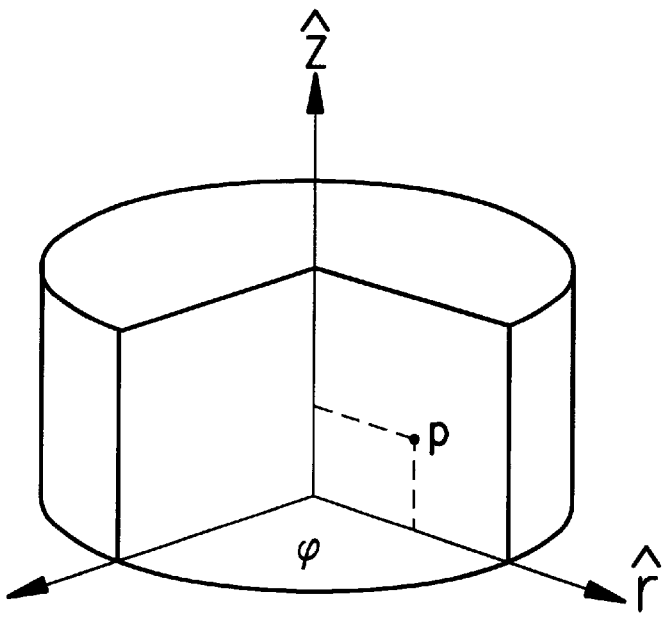
Figure 2H:
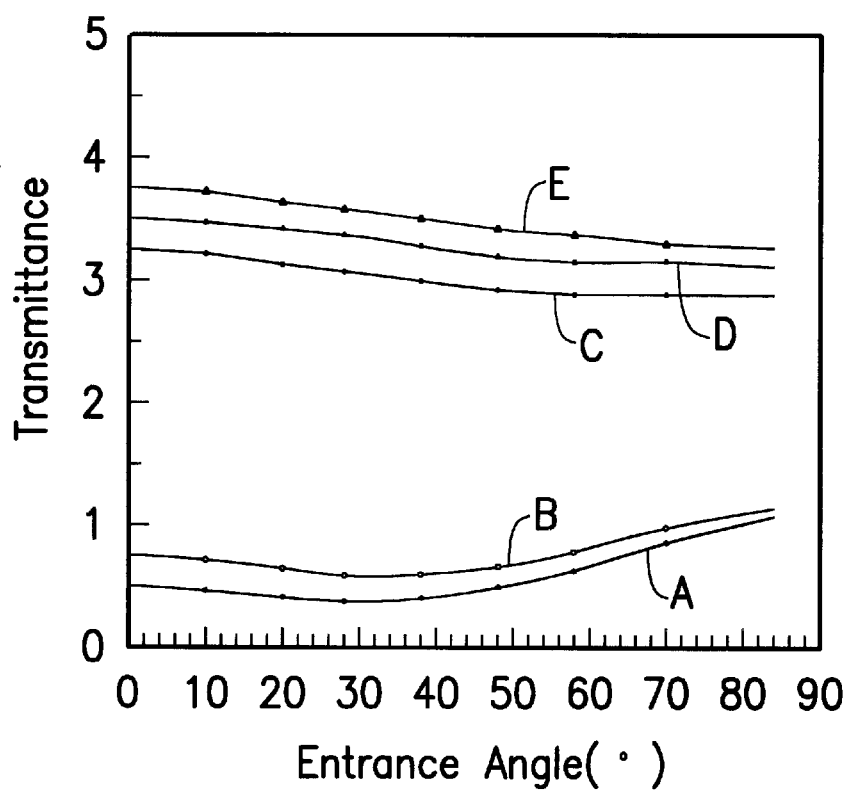
FIG. 2h is a diagram illustrating the relation between transmission and entrance angle of CCLC of FIG. 2a at different bias voltages.
Figure 2D:
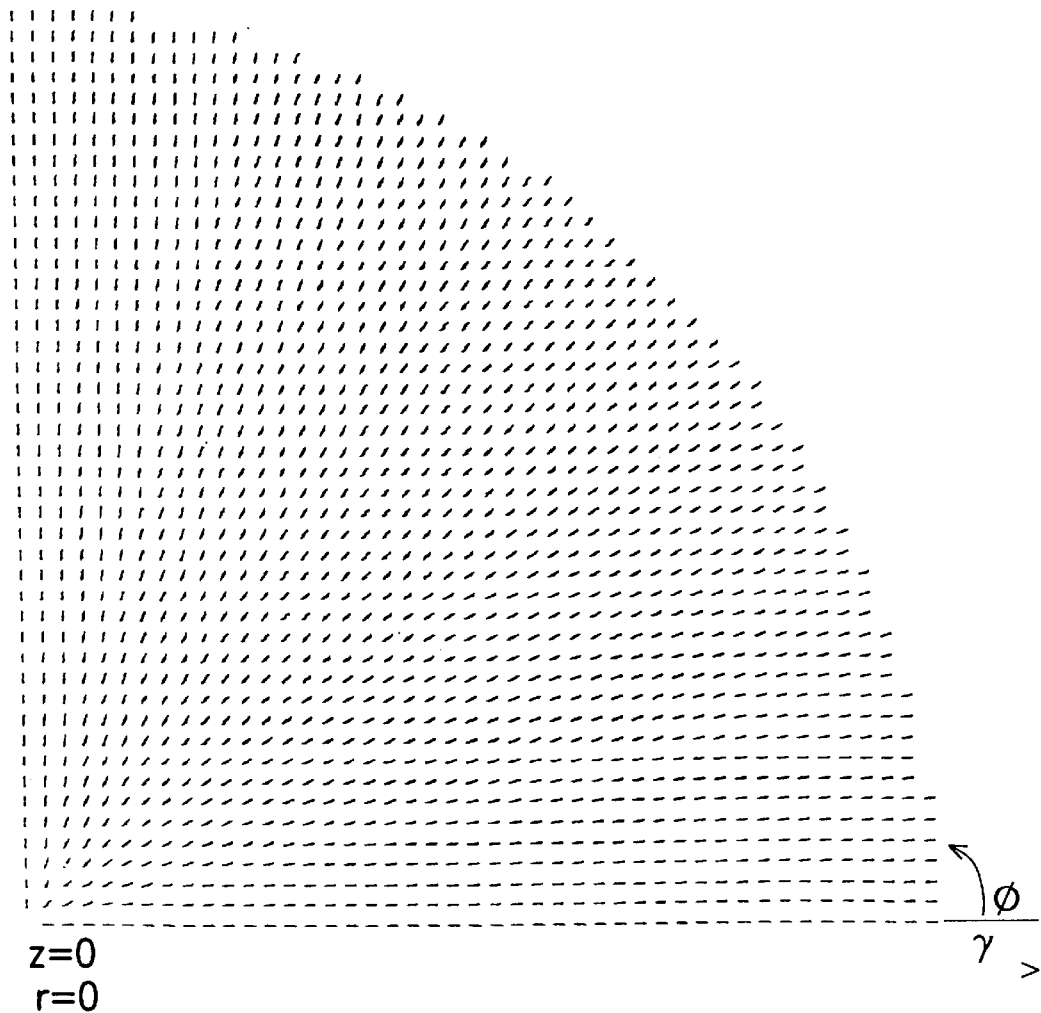
FIG. 2d is a diagram illustrating the distribution of the liquid-crystal molecules along the φ-axis in the CCLC of FIG. 2a while the bias voltage is 2.7 volts.
Figure 2E:
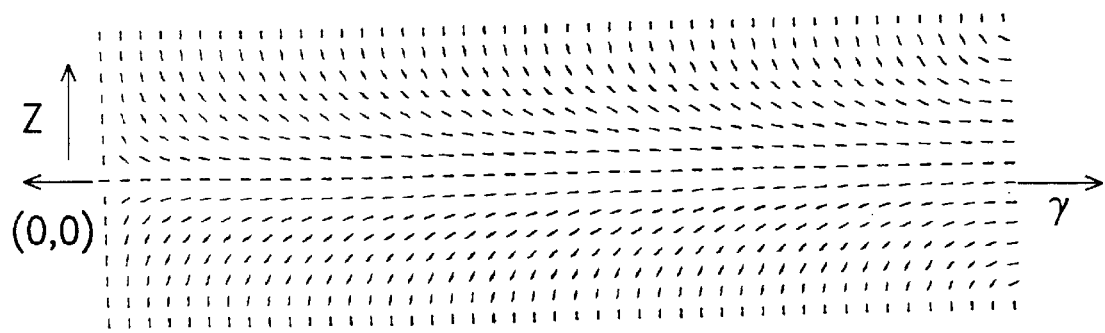
FIG. 2e is a diagram illustrating the distribution of the liquid-crystal molecules along the z-axis in the CCLC of FIG. 2a while the bias voltage is 2.7 volts.

Referring to FIG. 2c, which illustrates a cross-sectional view of a cylindrical CCLC structure and the coordinates, since the cavity is symmetric to the z-axis and the liquid-crystal material is hemeotropic to the circumference, the alignment of the liquid-crystal in the cavity is circularly symmetric. Referring to FIGS. 2d and 2e, which illustrates the alignment of the liquid-crystal molecules in the cylindrical cavity while the bias voltage is 2.7 volts in this embodiment, wherein FIG. 2d shows the alignment of the liquid-crystal molecules in the first section of ($\gamma,\phi$) plane at z=0, and FIG. 2e shows the alignment of the liquid-crystal molecules in ($\gamma,z$) plane, it is noted that singular points exist at $\gamma=0$ and z=0, and all of the liquid-crystal molecules are located in the ($\gamma,z$) plane without a $\phi$ component.

Figure 2F:
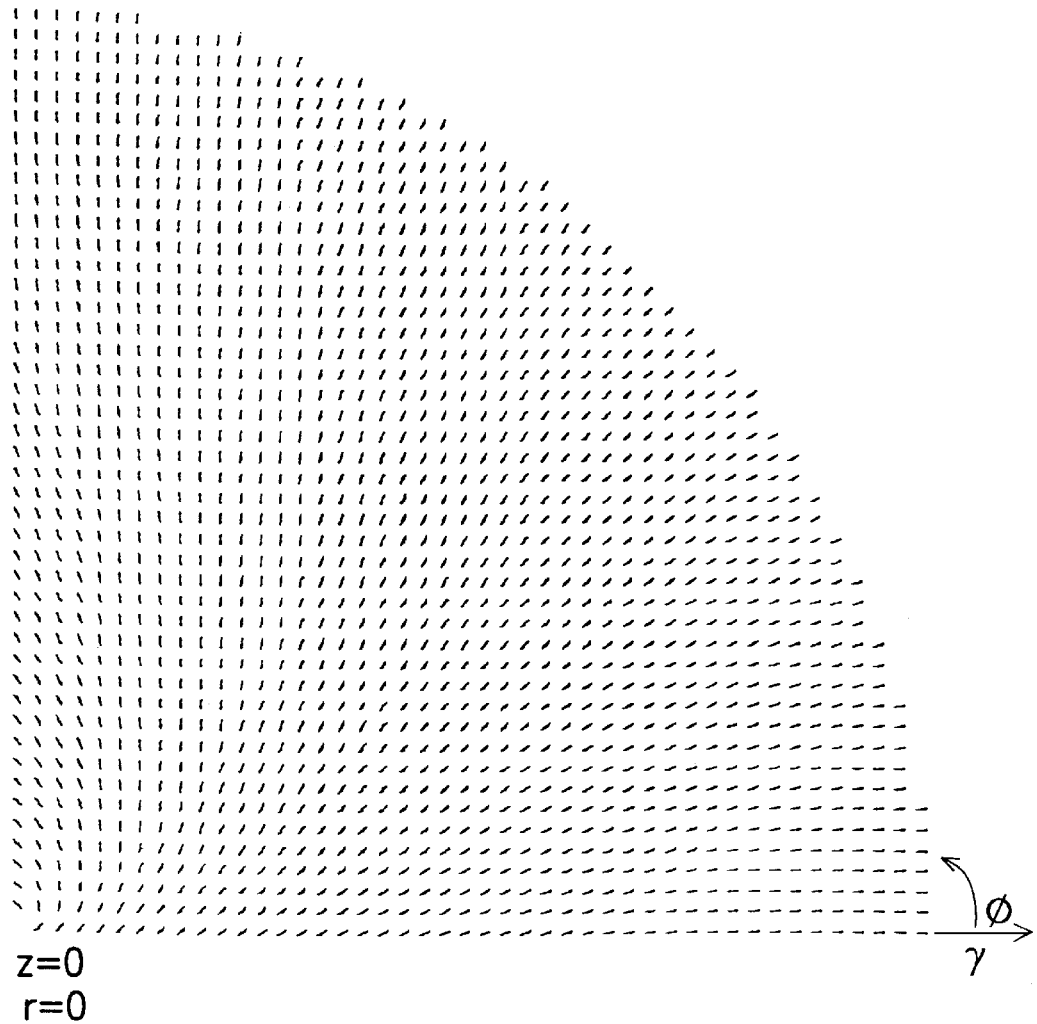
FIG. 2f is a diagram illustrating the distribution of the liquid-crystal molecules along the φ-axis in the CCLC of FIG. 2a while the bias voltage is 5.4 volts.
Figure 2G:
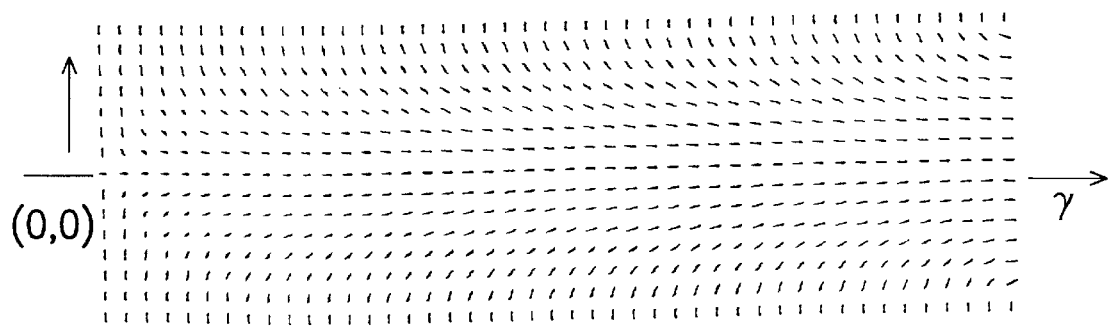
FIG. 2g is a diagram illustrating the distribution of the liquid-crystal molecules along the z-axis in the CCLC of FIG. 2a while the bias voltage is 5.4 volts.

Referring to FIGS. 2f and 2g, while the bias voltage is 5.4 volts, the liquid-crystal molecules are located in the ($\gamma,z$) plane with a $\phi$ component, that is, the alignment of the liquid-crystal molecules is twisted. However, the alignment is still circularly symmetric to the z-axis. In other words, the alignment of the liquid-crystal molecules is a function of ($\gamma,z$). The light passing through the closed cavity is therefore circularly symmetric. Accordingly, the viewing angle is independent of the azimuthal angle. Moreover, the viewing angle can be enlarged since the liquid-crystal molecules are symmetric to the plane where z=0. Referring to FIG. 2h, which illustrates the relation between the viewing angle and the transmittance, Curve A represents that no voltage is applied, Curve B represents a bias voltage of 2.6 volts, Curve C represents a bias voltage of 2.7 volts, Curve D represents a bias voltage of 5.3 volts, and Curve E represents a bias voltage of 5.4 volts. The transmittance has a little dependence on the varied entrance angles. The curves corresponding to different bias voltages have no intersection. Thus, the range of the viewing angle without gray scale reverse can be increased.

Preferred Embodiment 2

Figure 3A:
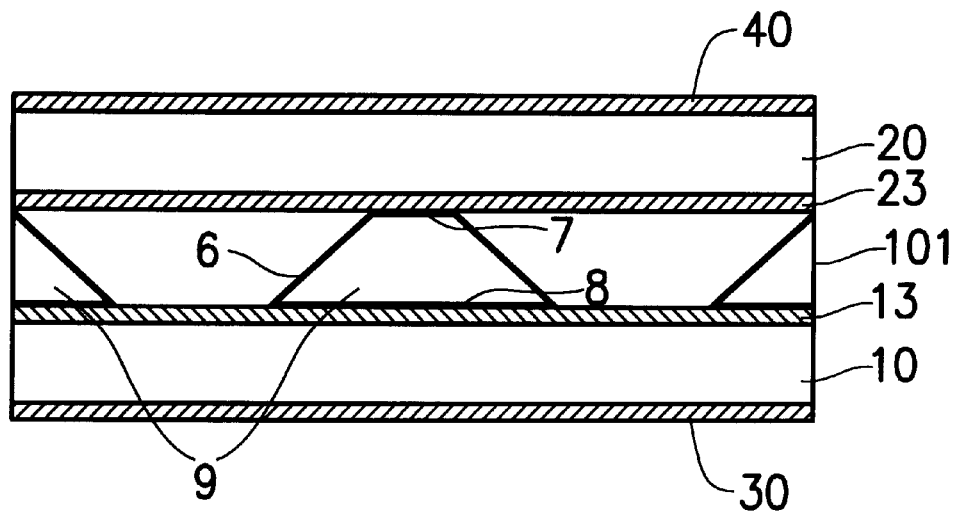
FIG. 3a is a cross-sectional diagram illustrating another preferred embodiment of CCLC according to the present invention.

Referring to FIG. 3a, another preferred embodiment of the CCLC display according to the present invention includes: an insulator layer 101, in which a plurality of pillar cavities 9 filled with liquid-crystal are formed; a first substrate 10, positioned on one side of the insulator layer 101, and provided with a transparent electrode 13 on one side thereof near the insulator layer 101; and a second substrate 20, positioned on another side of the insulator layer 101, and also provided with a transparent electrode 23 on one side thereof; a first linear polarizer 30 placed on another side of the first substrate 10; and a second linear polarizer 40 placed on another side of the second substrate 20, in which the absorption axis of the second linear polarizer 40 is perpendicular to that of the first linear polarizer 30.

This embodiment comprises the same components as the first embodiment except that the closed cavity is conical in this embodiment. That is, the insulator layer is etched to form cavities by wet etching in this embodiment.

Figure 3B:
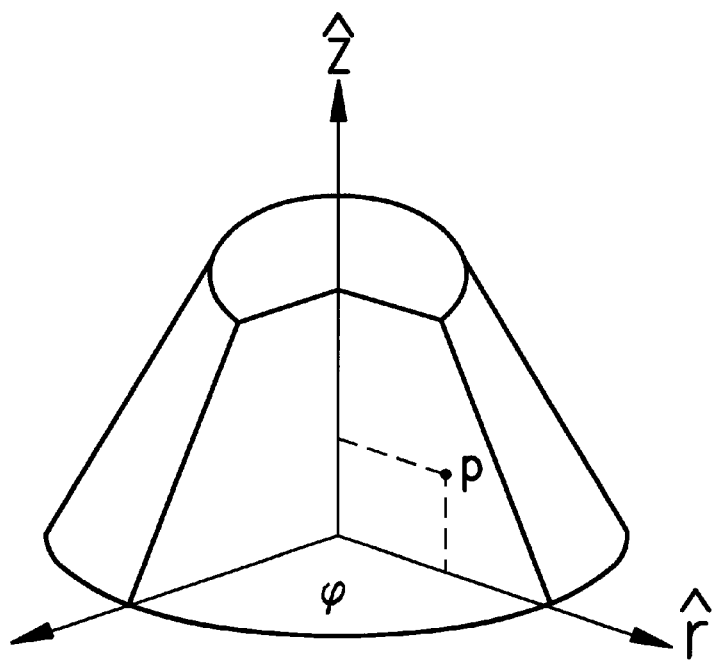
Figure 3C:
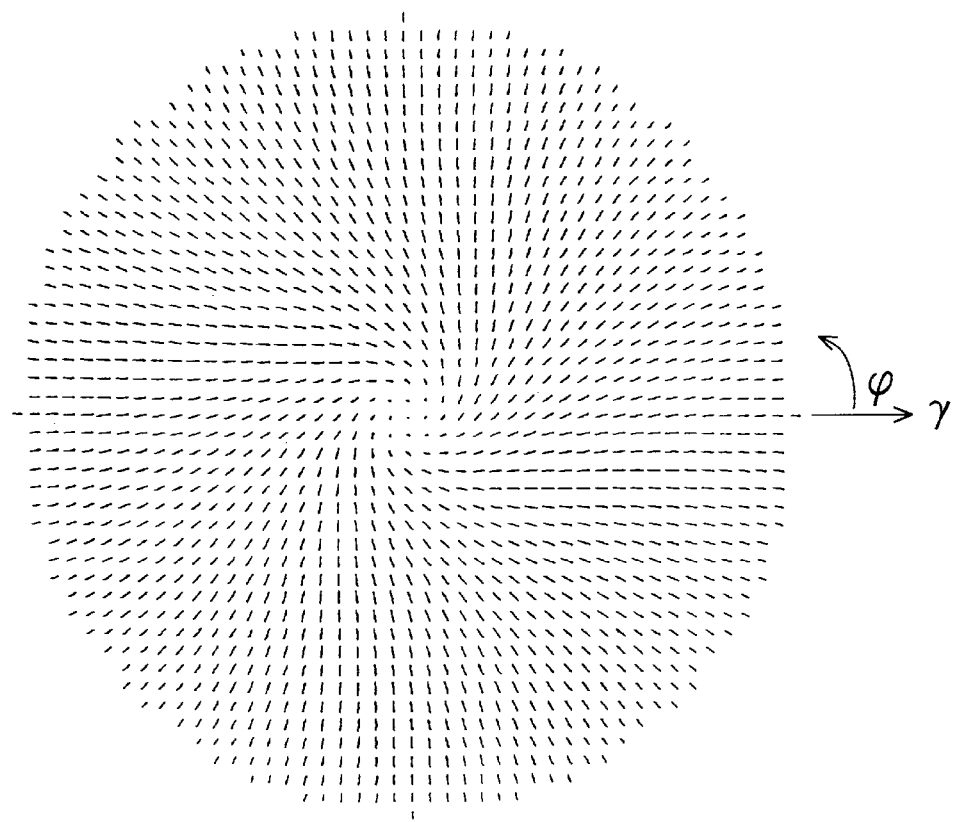
FIG. 3c is a diagram illustrating the distribution of the liquid-crystal molecules along the φ-axis in the CCLC of FIG. 3a while the bias voltage is 4 volts.
Figure 3D:
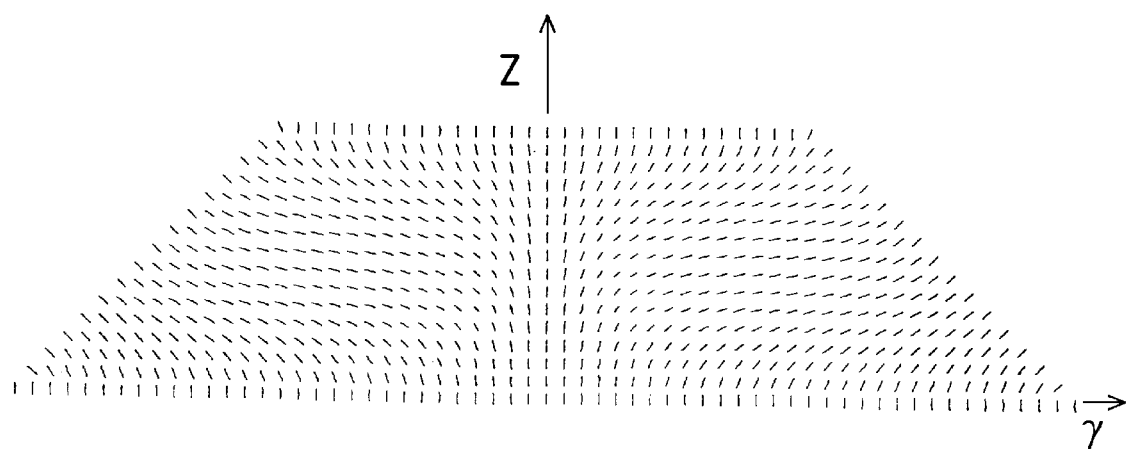
FIG. 3d is a diagram illustrating the distribution of the liquid-crystal molecules along the z-axis in the CCLC of FIG. 3a while the bias voltage is 4 volts.
Figure 3E:
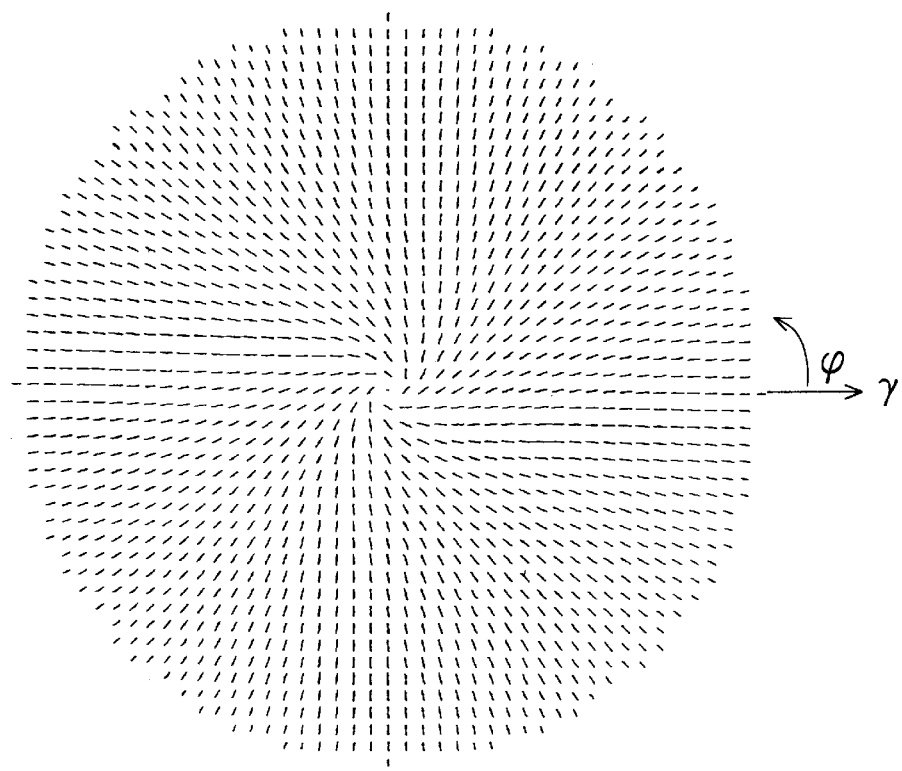
FIG. 3e is a diagram illustrating the distribution of the liquid-crystal molecules along the φ-axis in the CCLC of FIG. 3a while the bias voltage is 5 volts.
Figure 3F:
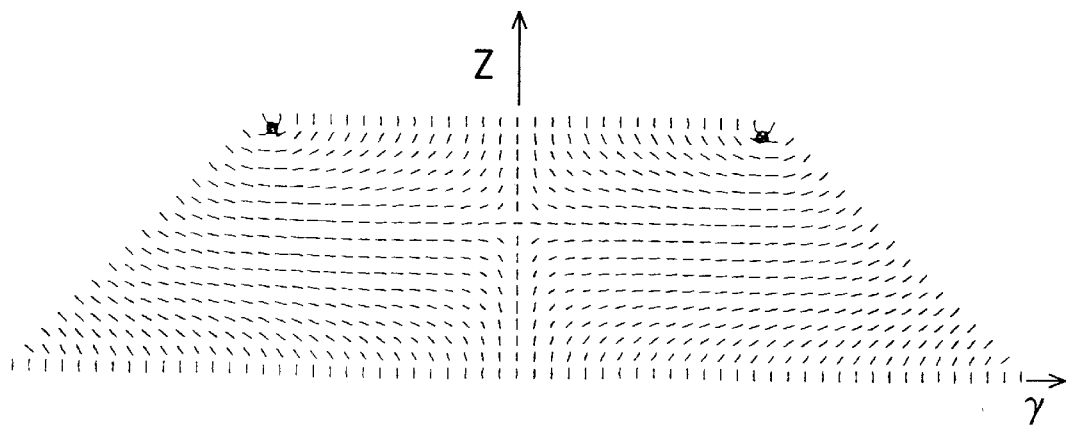
FIG. 3f is a diagram illustrating the distribution of the liquid-crystal molecules along the z-axis in the CCLC of FIG. 3a while the bias voltage is 5 volts.

Referring to the structure of a conical cavity and the coordinate shown in FIG. 3b, which is still symmetric to the z-axis. Since the shape of the closed cavity is different from that of the first embodiment, the alignment of the liquid-crystal molecules is different in the closed cavities of the first embodiment and the second embodiment. FIGS. 3c and 3d illustrate the alignment of the liquid-crystal molecules while the bias voltage is 4 volts. The alignment of the liquid-crystal molecules is twisted in the ($\gamma,\phi$) plane, and has no singular point in the ($\gamma,z$) or ($\gamma,\phi$) plane. FIGS. 3e and 3f illustrate the alignment of the liquid-crystal molecules while the bias voltage is 5 volts. The alignment of the liquid-crystal molecules is still twisted in the ($\gamma,\phi$) plane, and has a singular point in the ($\gamma,z$) plane where y=0. Furthermore, a singular ring exists at the position where the obtuse angle of the conical cavity is formed. However, since the liquid-crystal molecules are still symmetric to the z-axis, the viewing angle for a conical cavity is independent of the azimuthal angle in this embodiment.

Figure 3G:
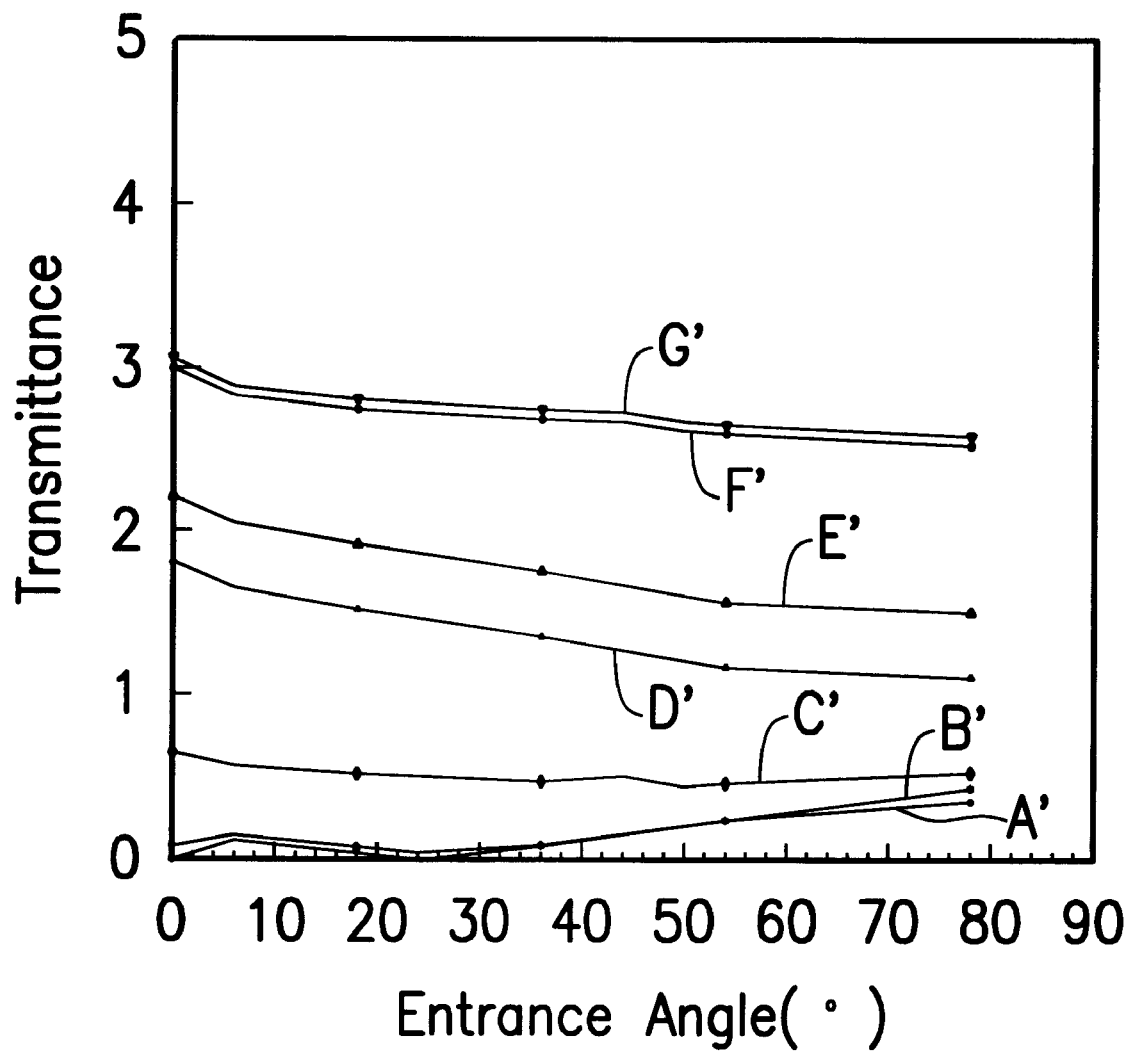
FIG. 3g is a diagram illustrating the relation between transmission and entrance angle of CCLC of FIG. 3a at different bias voltages.

Refer to FIG. 3g, which illustrates the relation between the entrance angle and the transmittance. Curve A' represents that no voltage is applied, Curve B' represents a bias voltage of 2.0 volts, Curve C' represents a bias voltage of 3.0 volts, Curve D' represents a bias voltage of 4.0 volts, Curve E' represents a bias voltage of 4.8 volts, Curve F' represents a bias voltage of 9.0 volts, and Curve G' represents a bias voltage of 10.0 volts. The transmittance has a little dependence on the varied entrance angle $\theta$. The curves corresponding to different bias voltages have no intersection. Thus, the range of the viewing angle without gray scale reverse can be increased.

Preferred Embodiment 3

Refer to FIG. 4a, which illustrates the cross view of the third preferred embodiment according to the present invention. The CCLC display of this embodiment has a similar construction to the second embodiment, except that a further phase compensator 50 is placed between the first substrate 10 and the first linear polarizer 30 to raise the contrast ratio of the CCLC display of this invention. Refer to FIG. 4b, the parallel refractive index $n_{//}$ is larger than the perpendicular refractive index $n_\perp$ in the index ellipsoid. The optical anisotropy causes the CCLC displays in the first and second embodiments of this invention having a transmittance which increases as the viewing angle increasing while the bias voltage is 0 volt. As shown by the curve A" in FIG. 4d, the contrast ratio is gradually deteriorated as the viewing angle increasing. To improve the contrast ratio of the CCLC display of this invention and to cancel the dependency of the transmittance on the viewing angle while the bias voltage is 0 volt, a negative phase compensator 50, in which the parallel refractive index $n_{//}$ is less than the perpendicular refractive index $n_\perp$ in the index ellipsoid as shown in FIG. 4c, can be provided on the first substrate 10. After the compensator is provided, the relation between the transmittance and the viewing angle is represented by curve B" of FIG. 4d.

Preferred Embodiment 4

Figure 5A:
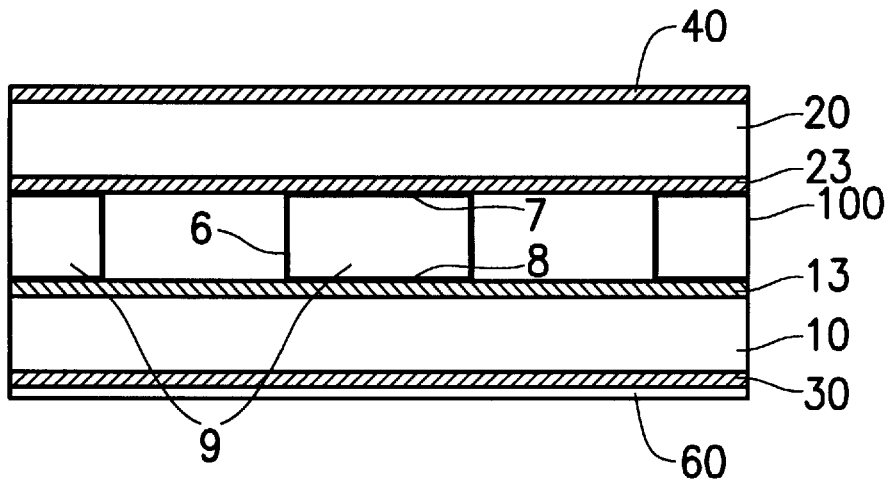
FIG. 5a is a cross-sectional diagram illustrating another preferred embodiment using the CCLC according to the present invention.
Figure 5B:
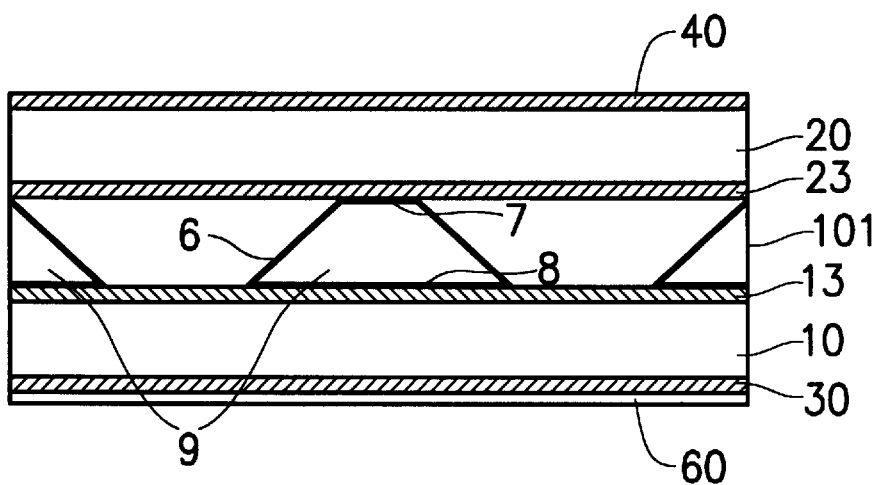
FIG. 5b is a cross-sectional diagram illustrating another preferred embodiment using the CCLC according to the present invention.
Figure 5C:
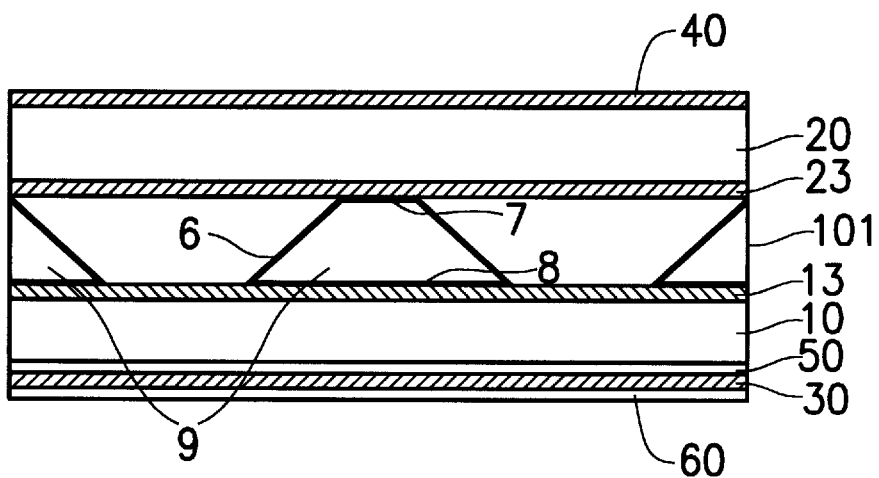
FIG. 5c is a cross-sectional diagram illustrating another preferred embodiment using the CCLC according to the present invention.

The feature of the construction of the fourth preferred embodiment according to this invention is that a reflector 60, which also can be applied to the previous embodiments as shown in FIGS. 5a, 5b and 5c, is positioned on the first substrate 10. The electrode 13 on the inner side of the substrate 10 must be a transparent conductive material such as ITO to enable the incident light to pass through the first substrate 10. Since the optical path in this embodiment is similar to that of passing through the liquid-crystal molecules shown in FIG. 2g once or a round trip passage through the liquid-crystal molecules shown in FIG. 3d, the CCLC display of this embodiment can provide a similar optical property to the previous embodiments.

Preferred Embodiment 5

Figure 6A:
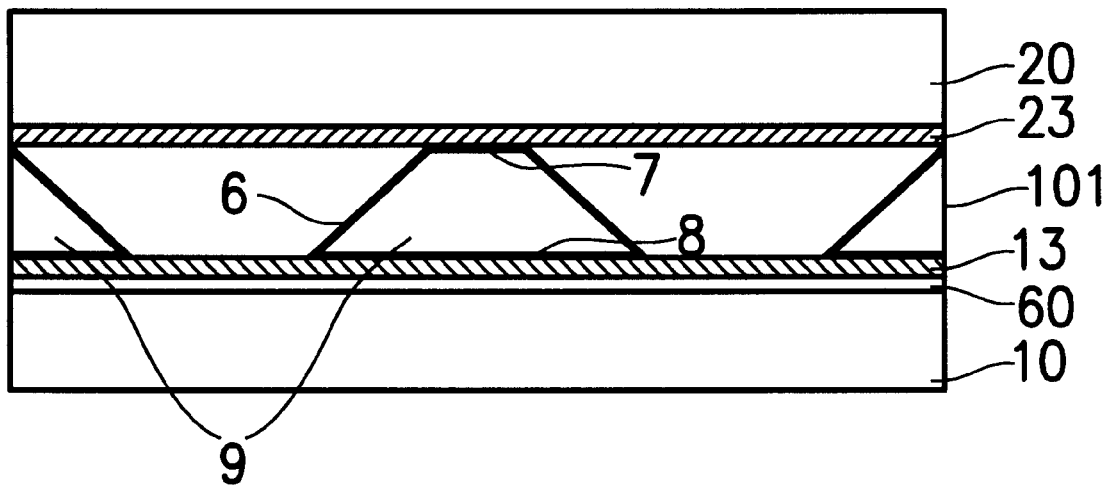
FIGS. 6a and 6b are cross-sectional diagrams illustrating another preferred embodiment using the CCLC according to the present invention.
Figure 6B:
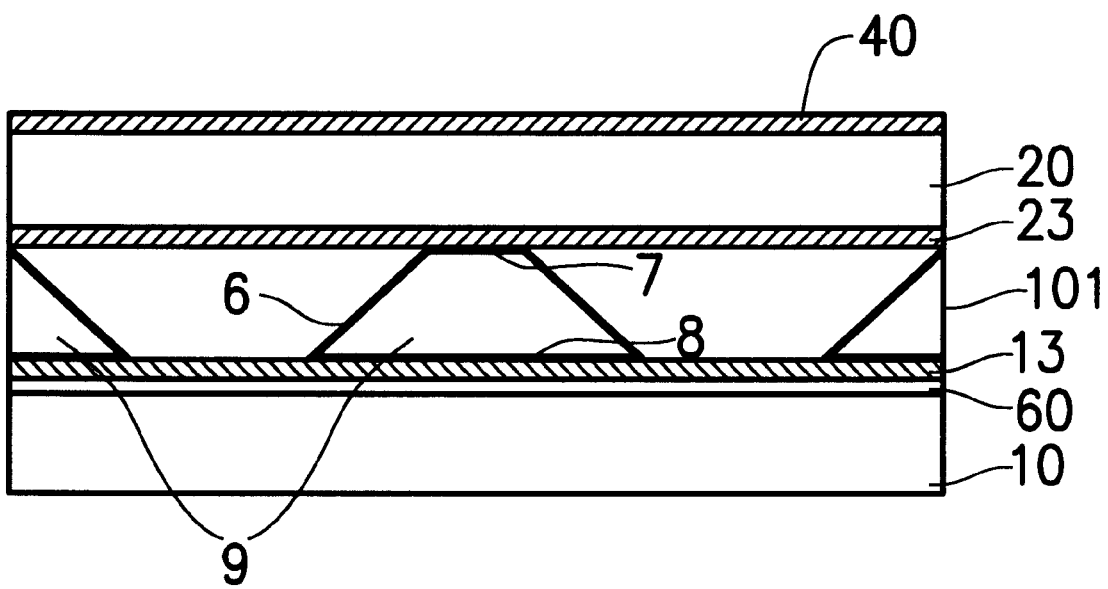
Figure 6C:
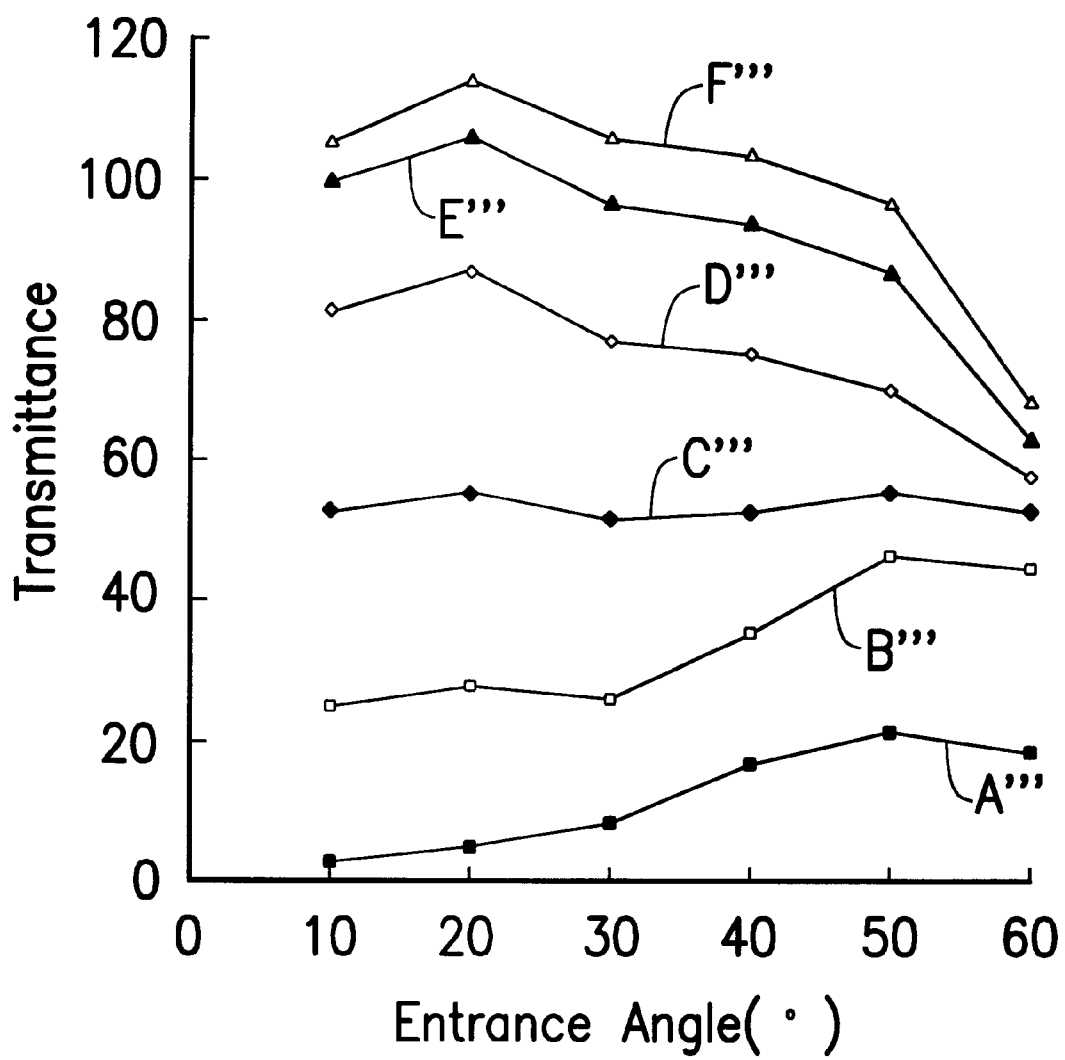
FIG. 6c is a diagram illustrating the relation between transmission and entrance angle of CCLC of FIG. 6a at different bias voltages.
Figure 7A:
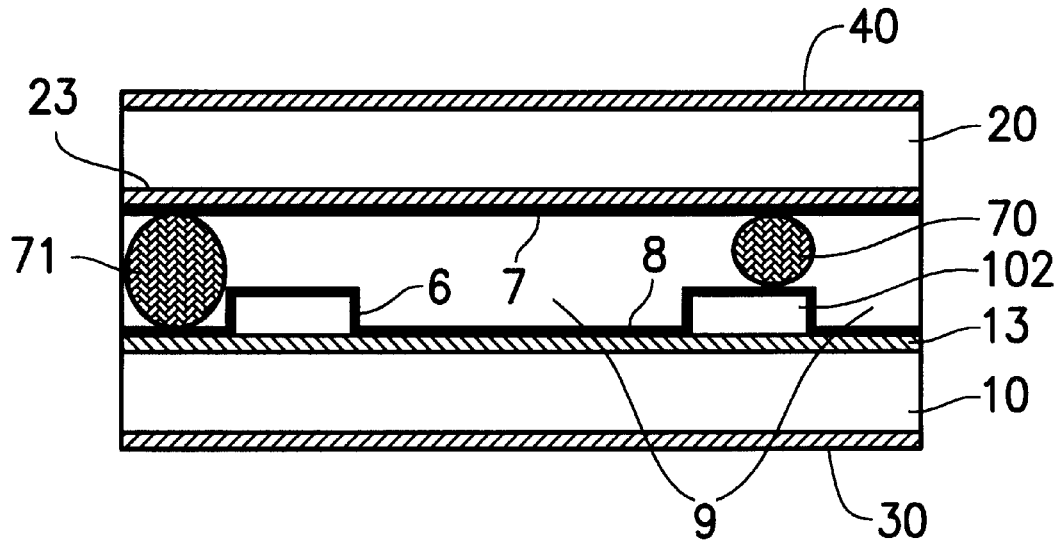
FIGS. 7a and 7b are cross-sectional diagrams illustrating another preferred embodiment using the CCLC according to the present invention.
Figure 7B:
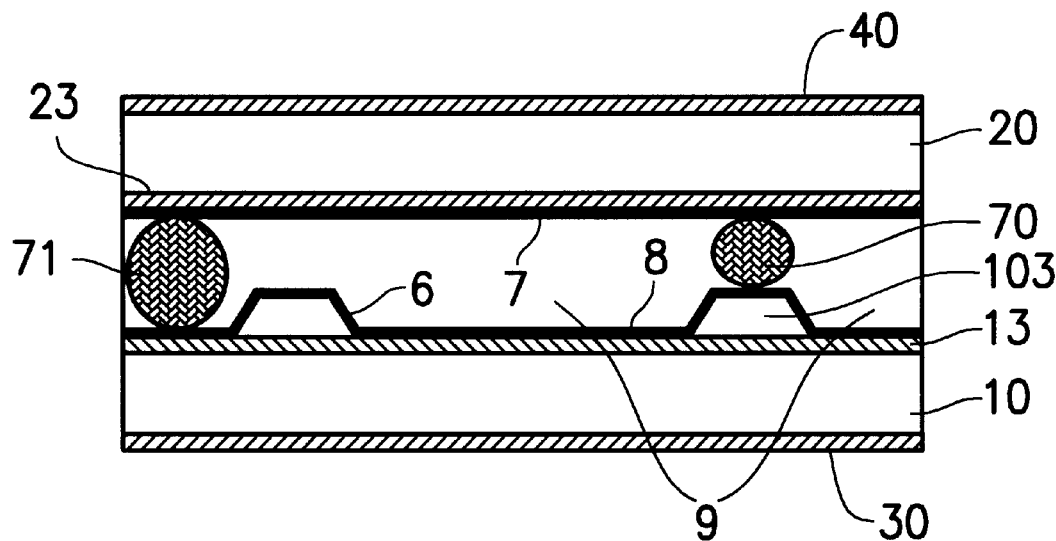

Referring to FIGS. 6a and 6b, the CCLC display of this embodiment is constituted by providing a reflector 60 to the structure as shown in FIG. 3a. The reflector 60 is positioned between the first substrate 10 and the transparent electrode 13. Alternatively, a metal reflective film can be used to replace the transparent electrode and the reflector to provide the functions of electrical conduction and optical reflection simultaneously. The optical property of the CCLC display of this embodiment is as shown in FIG. 6c, wherein Curve A''' represents that no voltage is applied, Curve B''' represents a bias voltage of 3.3 volts, Curve C''' represents a bias voltage of 3.8 volts, Curve D''' represents a bias voltage of 4.3 volts, Curve E''' represents a bias voltage of 4.8 volts, and Curve F''' represents a bias voltage of 5.4 volts. The maximum contrast ratio can be over 50%, and the total viewing angle is over 120°.

Preferred Embodiment 6

Figure 8A:
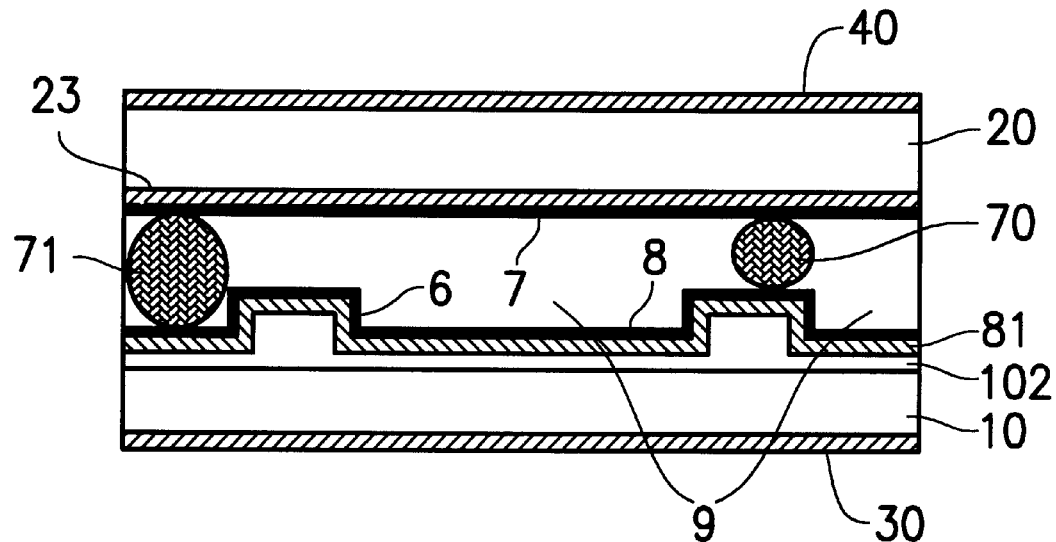
FIGS. 8a and 8b are cross-sectional diagrams illustrating another preferred embodiment using the CCLC according to the present invention.
Figure 8B:
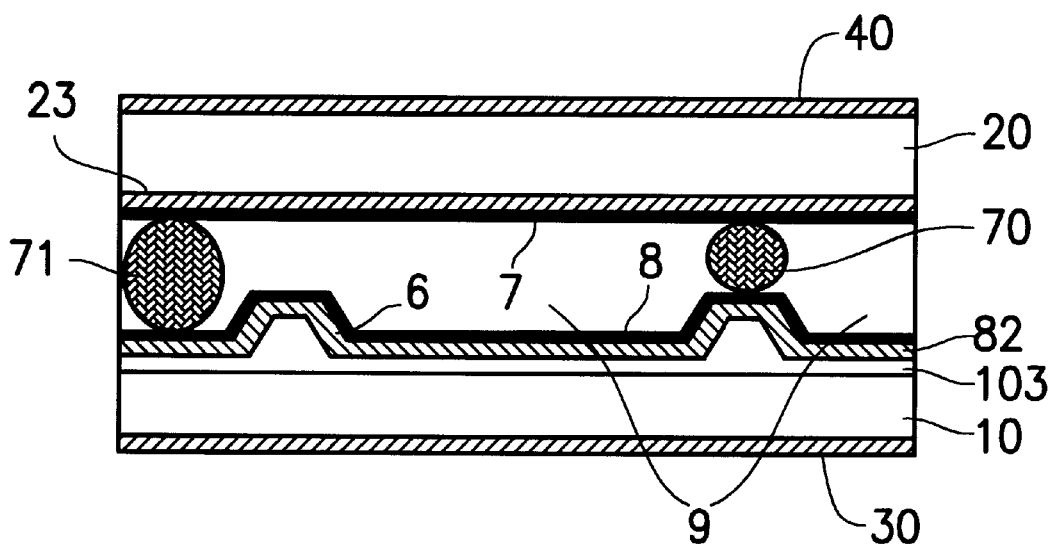

In the above embodiments, only cylindrical and conical closed-cavity liquid-crystal displays are described. In fact, the closed cavity can be a circular, elliptic, rectangular, hexagonal or multilateral shape of conical, trough-like or cylindrical cavity. Referring to FIGS. 7a, 7b and FIGS. 8a, 8b, the formation of a trough-like cavity is made by laminating the second substrate on the insulator layer of the first substrate but leaving a gap between two adjacent substrates. The gap between two substrates can be controlled by spacers 70 and 71, which can be made of plastic sphere, glass fiber or the same material as that of the insulator layer 102 or 103. Moreover, as shown in FIGS. 8a and 8b, the transparent electrodes 81 and 82 can be coated on the top surface of the insulator layers 102 and 103, respectively. Furthermore, the liquid crystal material used in the above embodiments may includes chiral dopant provided with optical rotation or dye.

The method for fabricating CCLC displays according to the above embodiments is similar. However, the method for patterning the insulator layer to form a plurality of cavities, in addition to photolithography, can be printing, pattern transfer, or phase separation. Moreover, the compensator used in the above embodiments can be made of optically uniaxial materials with a negative birefringence, two biaxial birefringent materials whose optical axes are perpendicular to each other, or materials comprising twisted uniaxial layers.

What is claimed is:

1. A fabrication method for a closed cavity of liquid-crystal display, comprising the steps of:
    (i) forming a first electrode on a first substrate, and forming an insulative layer on one side of the first electrode;
    (ii) forming a plurality of cavities in the insulator layer, wherein the plurality of cavities extend completely through the insulator layer;
    (iii) forming a second electrode on one side of a second substrate;
    (iv) coating an alignment layer on the first substrate, the second substrate and the inner surfaces of the plurality of cavities formed in the insulator layer;
    (v) spraying spacers on the second electrode on the second substrate, placing the first substrate on the second substrate with the first electrode and the second electrode inside, and partially sealing the edge to form a cell; and
    (vi) filling liquid-crystal material into the cell to form a plurality of closed cavities filled with the liquid-crystal material.

2. The fabrication method as claimed in claim 1, further comprising the step of: placing a first polarizer on the other side of the first substrate, and placing a second polarizer on the other side of the second substrate.

3. The fabrication method as claimed in claim 2, further comprising the step of: placing a compensator between the first substrate and the first polarizer.

4. The fabrication method as claimed in claim 1, further comprising the step of: forming a reflector on the first substrate before the formation of the first electrode, and then forming the first electrode on the reflector.

5. The fabrication method as claimed in claim 4, further comprising the step of: placing a second polarizer on the other side of the second substrate.

6. The fabrication method as claimed in claim 1, wherein the plurality of cavities formed in the insulator layer have a cylindrical shape.

7. A fabrication method for a closed cavity of liquid-crystal display, comprising the steps of:
    (i) forming an insulator layer on a first substrate, and forming a plurality of cavities in the insulator layer, so that the plurality of cavities extend completely through the insulator layer;
    (ii) forming a first electrode on one side of the insulator layer and the corresponding end of the plurality of cavities formed in the insulator layer;
    (iii) forming a second electrode on one side of a second substrate;
    (iv) coating an alignment layer on the first substrate, the second substrate and the inner surface of the plurality of cavities formed in the insulator layer;
    (v) spraying spacers on the surface of the second electrode on the second substrate, placing the first substrate on the second substrate with the first electrode and the second electrode inside, and partially sealing the edge to form a cell; and
    (vi) filling liquid-crystal material into the cell to form a plurality of closed cavities filled with the liquid-crystal material.

8. The fabrication method as claimed in claim 7, further comprising the step of: placing a first polarizer on the other side of the first substrate, and placing a second polarizer on the other side of the second substrate.

9. The fabrication method as claimed in claim 8, further comprising the step of: placing a compensator between the first substrate and the first polarizer.

10. The fabrication method as claimed in claim 7, further comprising the step of: forming a reflector on the first substrate before the formation of the first electrode, and then forming the first electrode on the reflector.

11. The fabrication method as claimed in claim 10, further comprising the step of: placing a second polarizer on the other side of the second substrate.

12. The fabrication method as claimed in claim 7, wherein the plurality of cavities formed in the insulator layer have a cylindrical shape.

* * * * *